May 16, 1933.  J. H. ASHLEY  1,908,807
FRUIT JUICE EXTRACTOR
Filed Nov. 6, 1930  2 Sheets-Sheet 1
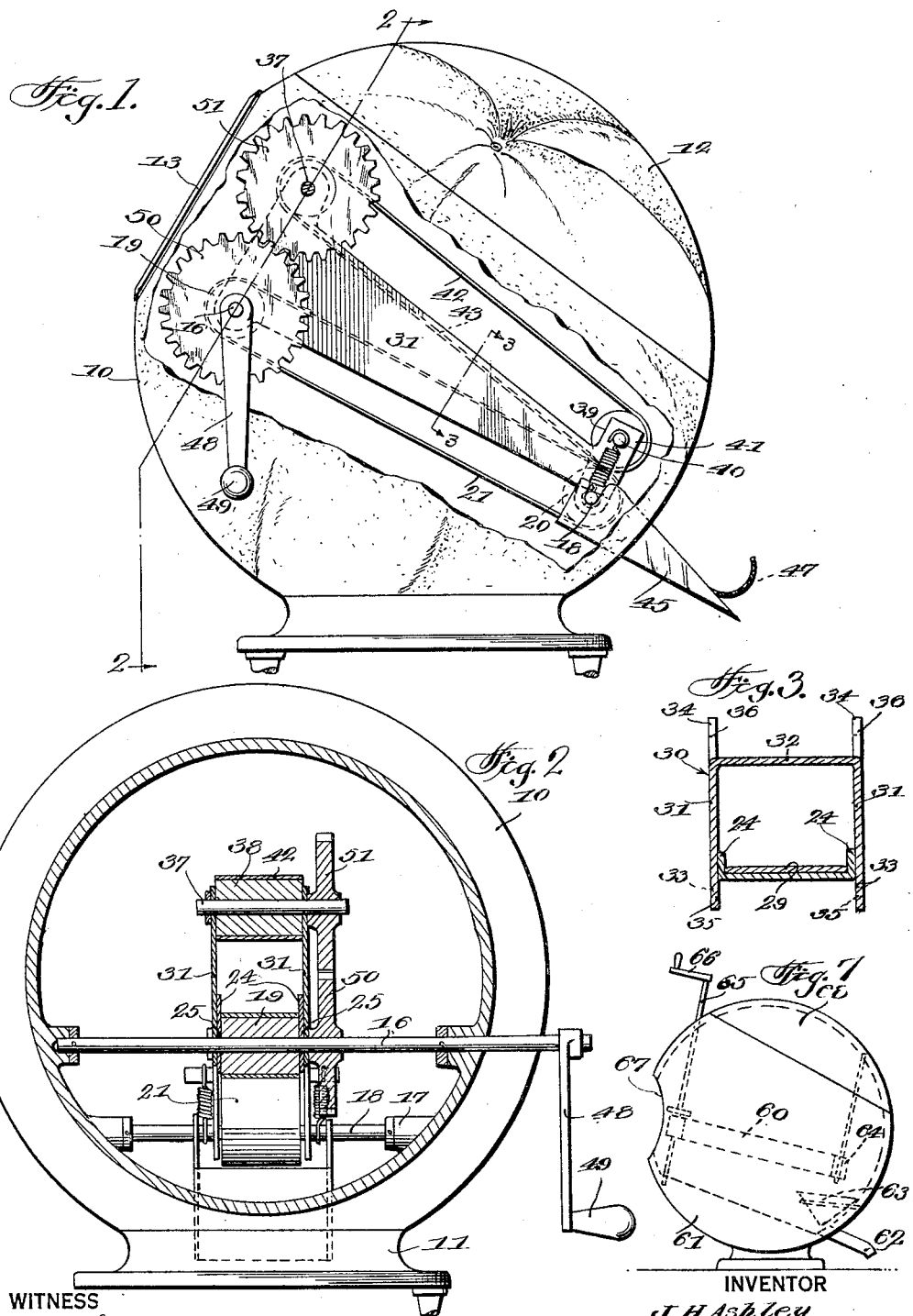
INVENTOR
J. H. Ashley
BY
ATTORNEY

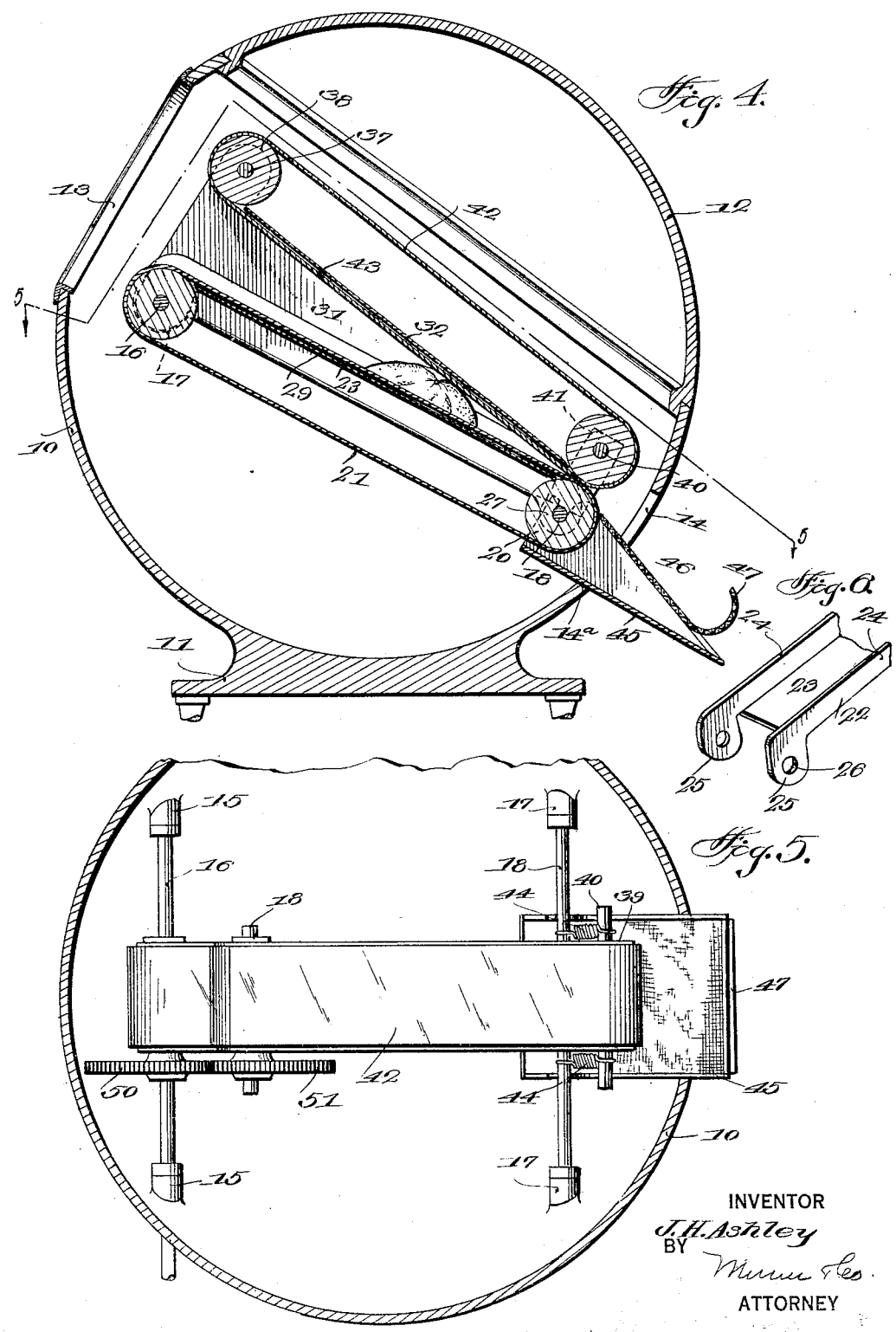

Patented May 16, 1933

1,908,807

UNITED STATES PATENT OFFICE

JAMES H. ASHLEY, OF MELBOURNE, FLORIDA

FRUIT JUICE EXTRACTOR

Application filed November 6, 1930. Serial No. 493,888.

My invention relates to a machine for extracting juices from fruit and particularly from citrus fruit and consists in the novel combination of elements, constructions and arrangement of parts and operations to be hereinafter specifically described and claimed.

It is an object of the invention to provide an efficient device of this character which will be strong and simple in construction.

It is a further object of the invention to provide a device of this character which may be easily cleaned and kept in a sanitary condition.

A further object of the invention is to provide a device, the parts of which may be readily and cheaply manufactured.

It is a further object of the invention to provide a device which will be simple in operation, composed of a minimum number of parts and which will not be likely to be easily broken or get out of order.

Other important objects and advantages will become apparent during the course of the following detailed description, taken in conjunction with the accompanying drawings forming a part of this application, in which:

Figure 1 is a perspective view of the assembled device with part of the casing broken away;

Fig. 2 is a cross section on line 2—2 of Fig. 1;

Fig. 3 is a cross section on line 3—3 of Fig. 1;

Fig. 4 is a vertical cross section through the center of the device;

Fig. 5 is a section taken on the line 5—5 of Fig. 4;

Fig. 6 is a perspective view of a part of the device; and

Fig. 7 is a side elevation of a modified form of the invention showing some of the parts in dotted lines.

Referring now to the drawings in detail, a casing 10 is mounted upon a suitable base 11. The casing 10 is preferably formed in the shape of an orange or other citrus fruit and is provided with a removable cover 12 which provides access to the mechanism contained within the receptacle. The receptacle 10 is further provided with an opening 13 at one side thereof through which cut fruit such as halves of oranges, lemons, or the like may be introduced to the juice extractor and is further provided with an opening 14 diametrically opposite the opening 13 through which the pressed fruit and juices pass after the extracting operation. The interior of the receptacle 10 is provided adjacent the opening 13 with an opposed pair of bosses 15. The bosses 15 provide bearing supports for the shaft 16. A pair of opposed bosses 17 is provided adjacent the outlet opening 14 which form bearing supports for the shaft 18.

A roller 19 is mounted on the shaft 16 and is centered with respect to the opening 13. A roller 20 is mounted in the shaft 18 and centered with respect to the opening 14. An endless belt 21 is trained over the rollers 19 and 20 to form an endless conveyor between the openings 13 and 14.

A U-shaped trough member 22, one end of which is shown in Fig. 6 is provided with a flat bottom 23 and upstanding sides 24. The bottom 23 terminates short of the sides 24 and the latter are provided with depending ears 25 at the upper end thereof which are provided with openings 26 through which shaft 16 passes and whereby the trough is firmly mounted at the upper end. The lower end of the trough 22 is formed similar to the upper end thereof, the bottom 23 terminating short of the ears 27 through which the shaft 18 is adapted to pass to provide a firm mounting for said lower end. The bottom 23 of the trough 22 is adapted to closely underlie the top flight 29 of the conveyor belt 21 and to form a solid support for the same to slide over.

It will be noted that the ears 25 and 27 straddle the rollers 17 and 20 respectively and that the bottom 23 terminates just short of the top of said rollers.

A guard 30 is provided with triangularly-shaped spaced apart sides 31. The sides being joined together by a top web 32 to form a substantially inverted U-shaped structure. The triangular sides 31 of the member 30 taper from the opening 13 to the opening 14. The sides 31 extend beyond the top 32 at each end thereof. The sides 31 at their widest part are each provided with depending ears 33 and upstanding ears 34. The depending ears 33 are provided with openings 35 through which the shaft 16 passes. The sides 31 and ears 33 straddle the roller 19, trough 22 and conveyor belt 21. The ears 34 are provided with openings 36 in which a rotatable shaft 37 is journalled. The shaft 37 carries the roller 38 between the ears 34, the roller 38 being keyed or otherwise secured to the shaft 37.

The sides 31 taper toward the opening 14 and have upstanding ears 39 formed at the lower end thereof. A shaft 40 is journalled in the ears 39 and a roller 41 is journalled on the shaft 40 between the ears 39. An endless belt 42 is trained over the rollers 38 and 41. The top 32 of the guard member 30 is situated directly over the bottom flight 43 of the belt 42 and forms a firm backing therefor during the operation of the device. Coiled springs 44, one on either side of the rollers 20 and 41 have their ends hooked over the shafts 18 and 40 and tend to draw the rollers 20 and 41 into engagement with each other. The lower edge of the sides 31 may be formed so as to contact with the shaft 18 and thereby limit the movement of the rollers 20 and 41 toward each other.

A channel-shaped delivery spout 45 has its inner end removably supported by the shaft 18 and projects through the opening 14, resting on the lower edge 14a thereof and is provided with a strainer element 46 which is turned up at the lower end thereof as at 47 to catch the seeds and skins which are ejected from the compressing rollers and to allow the strained juices to pass through the screen and out the spout to a suitable receptacle.

In order to drive the rollers and the belts trained thereover, the shaft 16 projects through one side of the casing 10 and is provided with a crank 48 which carries a handle 49. Inside the casing the shaft 16 is provided with a gear 50 which is keyed or otherwise secured thereto and which meshes with a gear 51 keyed to the shaft 37.

It will be noted that by virtue of the structure above described two superposed endless conveyor elements are provided which converge from a point adjacent the opening 13 to a point adjacent the opening 14 so that pieces of fruit or the like introduced on the conveyor 21 will be carried toward the opening 14 and during its progress will be pressed between the two conveyor elements as clearly shown in Fig. 4. The elements are easily driven simultaneously at the same speed by means of the crank 48, handle 49, shaft 16, and gears 50 and 51. In order to prevent the device from jamming when the fruit reaches the compression rollers 20 and 41, the springs 44 have been provided which allow the rollers 41 to be urged upwardly by reason of the fruit passing between the rollers.

It will also be noted that the guard element 30 is journalled on the shaft 16 and that the entire element with its associated rollers and conveyor belt is permitted to pivot about this point against the retracting action of the springs 44. The sides 31 overlap the sides 24 of the lower channel member 22 and act as guides, always insuring that the parts will be returned to correct alined position after separation. The sides 24 and 31 also prevent the fruit and juices from flowing or spattering into the interior of the casing.

In the modified form of the invention shown in Fig. 7, the conveyor pressing elements generally designated 60 are substantially the same construction as those described in connection with the preferred form with the exception that the entire presser structure and driving parts thereof are given a quarter turn thereby disposing the conveyors in face to face relation with the axis of the guide and driving rollers thereof substantially in the vertical. In this form of the invention the discharge opening 14 has been eliminated and the bottom of the casing 61 is made approximately plane and is inclined toward a spout 62 from which the fruit juice is delivered. A strainer 63 is supported within the casing adjacent the presser rolls 64 of the conveyor units so as to catch and strain the pressed fruit and juices as they are discharged from between said rolls.

The spaced apart rolls at the feed end of the presser unit are driven by a shaft 65, similar to the shaft 16, which is rotated by means of a crank 66 or any other suitable means.

A feed opening 67 similar to the opening 13 is provided through which the fruit is fed to the presser unit. Access to the interior of the casing for the purpose of cleaning the parts or removing pressed fruit from the strainer 63 is had by removing the top 68 thereof.

When it is desired to clean the device, this may be accomplished very expeditiously by removing the cover 12 and slipping the springs 44 off of the end of the shaft 40 whereupon the whole top half of the compressor structure may be pivoted about the shaft 16 and thoroughly cleaned. This is a distinct advantage as it is most desirable to keep a citrus fruit juice extractor very clean at all times due to the deteriorating action of the fruit juices.

Although a preferred embodiment of the invention has been shown and described, it will be understood that various changes in the details of construction may be made without departing from the spirit of the invention as defined by the appended claims.

I claim:

1. A juice extractor comprising pairs of rollers, endless belts trained about each pair of rollers, a trough at the ends of which one pair of rollers is mounted, and a guard on which the other pair of rollers is mounted, one end of the guard being pivotally connected with the trough and shaped to dispose confronting flights of the belts in converging relationship.

2. A juice extractor comprising a trough having a bottom, a guard having approximately triangular sides and including a top, flexible elements having flights traversing the respective bottom and top in confronting relationship, pairs of rollers respectively journalled adjacent the ends of the trough and guard by which rollers said elements are carried, and a shaft for each of the rollers, one of the shafts supporting corresponding apexes of the sides to provide a pivotal mounting for the guard.

3. A juice extractor comprising a casing having opposed openings, a pair of shafts journalled in said casing, rollers supported by said shafts, an endless conveyor element carried by said rollers, a trough supported by said shafts and including a bottom, the bottom of said trough forming a backing for the top flight of said conveyor, a guard element including triangular sides and a top web, the apex of each side opposite said top web being journalled to one of said shafts, rollers journalled between said sides at the apexes adjacent either end of said top web, an endless belt trained over said rollers and means for normally urging one of said rollers toward a corresponding roller on one of the other shafts.

4. A juice extractor comprising a trough having a bottom, a guard having approximately triangular sides and including a top, flexible elements having flights traversing the respective bottom and top in confronting relationship, pairs of rollers respectively journalled adjacent the ends of the trough and guard by which rollers said elements are carried, and a shaft for each of the rollers, one of the shafts supporting corresponding apexes of the sides to provide a pivotal mounting for the guard, and means for driving one of each pair of rollers.

5. A juice extractor comprising a trough having a bottom, a guard having approximately triangular sides and including a top, flexible elements having flights traversing the respective bottom and top in confronting relationship, pairs of rollers respectively supported adjacent the ends of the trough and guard by which rollers said elements are carried, and a shaft for each of the rollers, one of the shafts supporting corresponding apexes of the sides to provide a pivotal mounting for the guard, means for normally urging the free end toward the corresponding end of the trough and means for driving one roller of each of said pairs.

6. A juice extractor including a pair of spaced supporting shafts, rollers carried by said shafts, an endless element trained over said rollers, a guard element including substantially triangular sides having one of the apexes of each pivotally connected to one of said supporting shafts, rollers mounted between said sides adjacent the remaining apexes thereof, an endless element trained over said rollers, and means for urging one of said rollers toward the roller carried by the other supporting shaft.

JAMES H. ASHLEY.